United States Patent
Golowich et al.

(10) Patent No.: US 6,788,397 B1
(45) Date of Patent: Sep. 7, 2004

(54) TECHNIQUE FOR MEASURING MODAL POWER DISTRIBUTION BETWEEN AN OPTICAL SOURCE AND A MULTIMODE FIBER

(75) Inventors: Steven Eugene Golowich, New Providence, NJ (US); William Alfred Reed, Summit, NJ (US)

(73) Assignee: Fitel U.S.A. Corp., Norcross, GA (US)

(*) Notice: Subject to any disclaimer, the term of this patent is extended or adjusted under 35 U.S.C. 154(b) by 0 days.

(21) Appl. No.: 09/514,137

(22) Filed: Feb. 28, 2000

(51) Int. Cl.[7] .................... G01J 1/00; G01N 21/00
(52) U.S. Cl. ............................. 356/121; 356/73.1
(58) Field of Search ........................ 356/121–122, 356/73.1

(56) References Cited

U.S. PATENT DOCUMENTS 4,286,979 A  9/1981  Buckler et al.
5,359,447 A  10/1994  Hahn et al.
5,848,204 A  12/1998  Wanser
6,400,450 B1 *  6/2002  Golowich et al. ......... 356/73.1

OTHER PUBLICATIONS

TIA/EIA Telecommunications Systems Bulletin "Mode Power Distribution and Mode Transfer Function Measurement" Telecommunications Industry Association 1995, Aug. 1995, Arlington, VA.

* cited by examiner

Primary Examiner—Frank G. Fonz
Assistant Examiner—Amanda Merlino
(74) Attorney, Agent, or Firm—Wendy W. Koba

(57) ABSTRACT

A technique for measuring the modal power distribution of an optical source (for example, a laser) launching pulses into a multimode fiber involves a characterization of the multimode fiber itself in terms of its differential modal delay. A reverse differential mode delay measurement is then performed to characterize the interaction of the optical source with the multimode fiber. By knowing these characteristics, the modal power distribution of the source into the fiber can then be determined by using a reconstruction algorithm.

6 Claims, 5 Drawing Sheets

TECHNIQUE FOR MEASURING MODAL POWER DISTRIBUTION BETWEEN AN OPTICAL SOURCE AND A MULTIMODE FIBER

TECHNICAL FIELD

The present invention relates to a method for characterizing the modal power distribution of an optical signal launched from a laser source into a multimode optical fiber.

BACKGROUND OF THE INVENTION

There is currently a great deal of interest in optical local area networks operating at speeds of a Gbps or more. An Ethernet standard for such transmission is now in place and will inevitably function to accelerate the use of high speeds optical LANs. In order to achieve these high bit rates, semiconductor lasers (for example, vertical cavity surface emitting lasers (VCSELs) or Fabry-Perot (FP) lasers) will be used as transmission sources. In the case of most optical LANs, however, multimode fiber will be used, due to both its ease of installation compared to single mode fiber and the fact that there exists a significantly large embedded base of multimode fiber.

Historically, multimode fiber has been used with LEDs as sources, not lasers; where LEDs are known to launch nearly equal power into every mode (defined as an "overfilled" launch). In the current application for use with lasers, however, the optical launches will be very far from overfilled, based on the characteristics of laser emission. In order to develop fast, reliable, low-cost systems, it is crucial to understand the behavior of multimode fiber under these restricted, laser-based launched conditions.

It has previously been discovered that restricting the launch in the laser mode does not always increase the bandwidth of a multimode fiber relative to the overfilled launch bandwidth, as might be intuitively expected. For most fibers and most restricted launches, a bandwidth gain is seen, but there are also cases where the bandwidth actually decreases. The latter is a concern in attempting to develop a set of transmission standards for a gigabit Ethernet (GbE). In particular, one source of bandwidth decrease has been found to be attributable to refractive index perturbations near the fiber axis that are common to all major multimode fiber manufacturing techniques, resulting in a standards requirement for "offset launches" that avoids the center of the multimode fiber for certain applications.

The GbE standard is generally believed to be quite conservative. To close the gap between the standard and the optimal use of multimode fiber in LAN systems, accurate measurement tools are required. One such measurement tool is the measure of modal power distribution (MDP) of a source (i.e., laser) into a multimode fiber. The MPD essentially characterizes a launch, and is therefore clearly fundamental to understanding the behavior of a multimode fiber link. Also, many different optical sources for GbE are currently under development, so an accurate and robust measurement technique for evaluating the MPD induced by these sources is useful for both source development and selection.

One prior art technique for measuring MPD is based on calculations using ray optics, which becomes exact as the number of modes tends toward infinity. This technique, as described in detail in *Telecommunications Industry Association (TIA)/Electronics Industries Association (EIA) Telecommunications System Bulletin*, ITM-3, "Mode Power Distribution and Mode Transfer Function Measurement", dated Aug. 1995, requires a continuous wave (cw) measurement of the near-field intensity at the end of a length of fiber (which is generally accomplished with a CCD camera). For many applications, ray optics is a useful approach but for restricted launch situations, the approximation is not appropriate and the standard MPD reconstruction algorithm may yield incorrect results.

Another prior art technique again involves processing near-field intensity, but reconstructing the MPD using a modal, rather than a ray-optics, calculation This technique is discussed in detail in an article entitled "Modal Excitation of Optical Fibers: Estimating the Modal Power Distribution", TIA Draft Notes 2.2, J. S. Abbott, 1998. However, limitations in the near-field intensity data make the reconstruction problem of find the MPD difficult, and can thus limit the accuracy of the results in practice.

Thus, a need remains for properly characterizing the modal power distribution of an arbitrary laser source as launched into a multimode fiber.

SUMMARY OF THE INVENTION

The need remaining in the prior art is addressed by the present invention, which relates to a method for characterizing the modal power distribution of an optical signal launched from a laser source into a multimode optical fiber and, more particularly, to the use of a pulsed output from the source being tested as launched through a test fiber that will temporally separate the pulses. Additionally, an image of the test fiber endface may be obtained to provide both temporal and spatial data for reconstructing the MPD of the source.

In accordance with the present invention, the MPD measurement technique includes the steps of: (a) characterizing a predetermined test fiber (multimode) with a differential modal delay (DMD) measurement by scanning a single mode fiber across the input end of the test fiber and launching a short pulse at each position; (b) characterizing a launch condition resulting from a specified source under test (a reverse DMD measurement) using short pulses launched from the source with a single mode fiber scanned across the output end of the fiber; and (c) applying a reconstruction algorithm to recover the launched modal power from the data obtained in the first two steps.

In an alternative process of the present invention, the step of characterizing the reverse DMD may be omitted if the mode groups of the test fiber have sufficiently widely separated group velocities, the test fiber is long enough, and the source is capable of launching sufficiently short pulses at high enough powers.

Other and further features of the technique of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
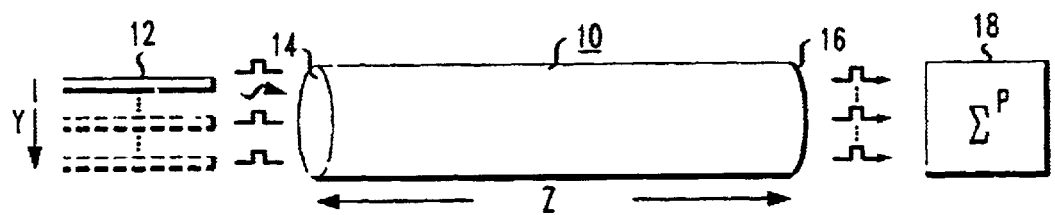
FIG. 1 illustrates an exemplary test arrangement for characterizing the differential mode delay (DMD) of a test fiber.

Prior to describing the modal power distribution measurement technique of the present invention, it is useful to understand the pertinent properties of the type of multimode fiber that will be used in optical LAN systems. In general, the standard multimode fiber used in local area network applications has a core diameter of 62.5 $\mu$m and a maximum fractional index difference ($n_{core}-n_{cladding}$)/$n_{core}$ of 0.02. This type of multimode fiber is typically used at one of two operating wavelengths, $\lambda$=850 nm or 1300 nm. The profiles are chosen to maximize the modal bandwidth, that is, to minimize the spread in modal group velocities. The optimal profile shape depends on the exact dispersion characteristics of the doped silica comprising the fiber, but is very close to a parabola The propagating modes can be divided into degenerate mode groups (DMGs) defined by the property that all modes in a DMG share a common phase velocity. In a standard multimode fiber at $\lambda$=1300 nm, there are roughly 22 such mode groups, while there are approximately 33 such groups at $\lambda$=850 nm. Random imperfections in the fiber will couple power between modes. In standard multimode fiber, the modes within a specific degenerate mode group are believed to be completely coupled within a few hundred meters, while the coupling between different mode groups is negligible.

A pulse launched into a given mode propagates at the group velocity of the mode, and spreads due to chromatic dispersion. When a group of modes are coupled together, as happens within a mode group, the pulses continually share power and ultimately merge into a single pulse, possibly broadened by modal, as well as chromatic, dispersion. Therefore, when a pulse of light is launched into modes of several mode groups of a standard multimode fiber, the impulse response of the fiber is expected to be the superposition of 22 or 33 pulses, depending on the wavelength. In a high bandwidth fiber, the group delays of the different mode groups will be very nearly the same, while in a low bandwidth fiber, the pulses will be spread out in time. This modal dispersion is generally considered to be the limiting factor in the performance of multimode fiber.

The modal power distribution (MPD) measurement system of the present invention relies on a number of assumptions, as described below. The first assumption is of complete modal coupling within a degenerate mode group, but no coupling between different mode groups. The lack of coupling between mode groups has been found to be highly accurate in today's multimode fiber, as determined from the associated differential modal delay and loss measurements. Precise information regarding coupling lengths within mode groups is difficult to ascertain, but some reports suggest that complete coupling occurs within a few hundred meters in uncabled fiber. By choosing a sufficiently long test fiber (for example, 1 km), it may be presumed that each degenerate mode group is uniformly populated.

The second assumption is that the differential modal attenuation of multimode fiber can be characterized by assigning a unique attenuation factor to each degenerate mode group. This assumption follows from the above presumption regarding complete coupling within a degenerate mode group. Lastly, it will be assumed that the impulse response of each degenerate mode group is Gaussian. There are two causes for pulse spreading within a mode group: chromatic dispersion and modal dispersion within the group. Under the conditions relevant to communications applications, the impulse response of each mode will be approximately Gaussian, due to chromatic dispersion. Without complete intra-group coupling, the impulse response would be a mixture of Gussians, but the effect of complete coupling is to render the impulse response to be again Gaussian.

With these assumptions in place, the impulse response of mode group i can be chararacterized as follows:

$$h(t, \tau_i, \gamma_i, \sigma_i) = \frac{1}{\sqrt{2\pi}\,\sigma_i} \exp\left[-\gamma_i z - \frac{1}{2\sigma_i^2}(t - \tau_i z)^2\right]$$

where $\tau_i$ is defined as the group delay per unit length of mode group i, $\gamma_i$ is its attenuation coefficient, $\sigma_i$ is the pulse width, and z is the length of the fiber. As discussed in detail below, this impulse response is used to characterize the modal power distribution in accordance with the present invention.

The MPD measurement system of the present invention provides estimates of the power launched into the various modes of a test fiber by a given light source. As described in detail below, the measurement system requires three steps: (1) characterization of a test multimode fiber (differential modal delay measurement); (2) characterization of a launch condition resulting from a specified source; and (3) application of a reconstruction algorithm to recover the launched modal powers from the data obtained in steps (1) and (2).

Figure 2:
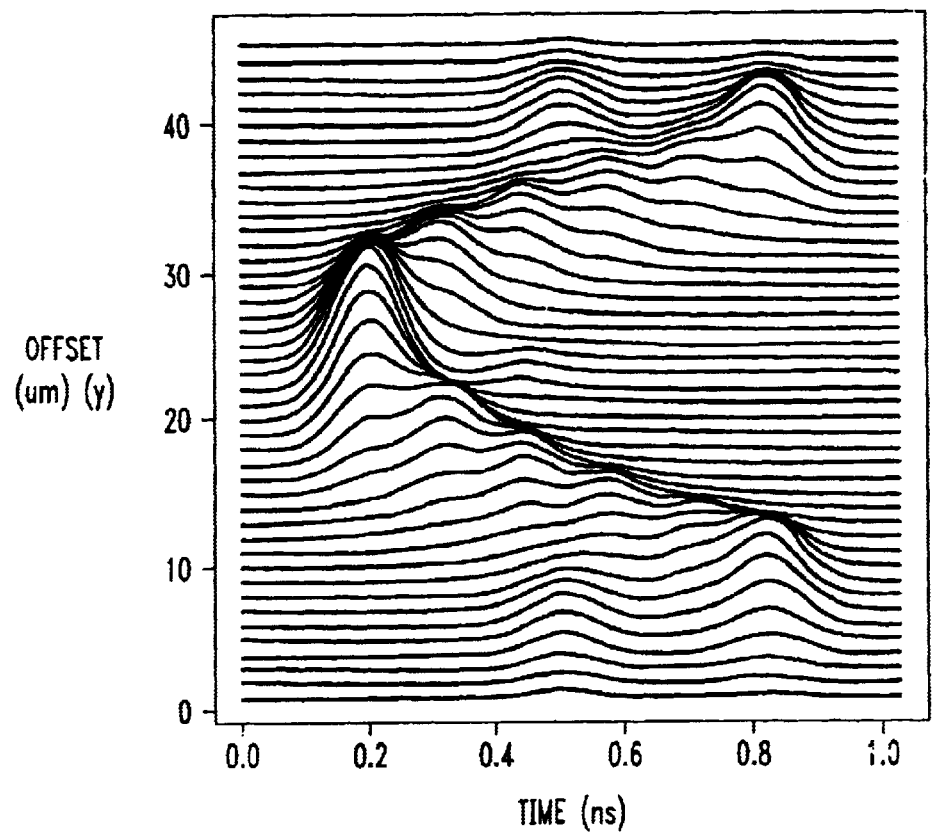
FIG. 2 contains a graph illustrating simulated DMD data from characterizing the test fiber of FIG. 1.

FIG. 1 illustrates, in simplified form, an exemplary test arrangement that may be used to determine the differential modal delay (DMD) for an exemplary test multimode fiber 10. As shown, a single mode input fiber 12 is scanned across the input endface 14 of multimode test fiber 10 (indicated in phantom in FIG. 1). A short pulse is launched into multimode fiber 10 and the total power P, as a function of time, is measured at output endface 16 of fiber 10 and stored in a measurement unit 18. One exemplary embodiment may use a 40 $\mu$m diameter multimode test fiber 10, with a maximal fractional index difference of $\Delta$=0.9%. Assuming input single mode fiber 12 exhibits a beam radius of 2.5 $\mu$m, the measurement results would be as depicted in the graph of FIG. 2.

Figure 3:
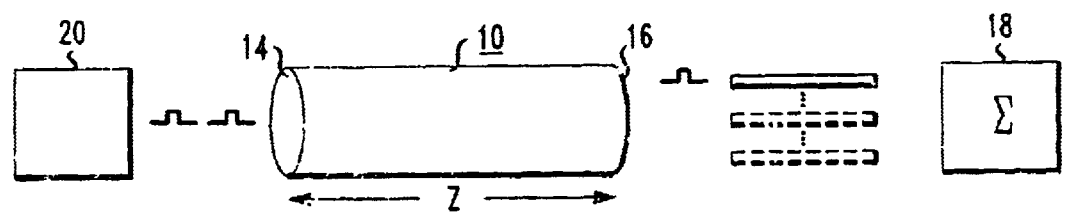
FIG. 3 illustrates an exemplary test arrangement for characterizing the reverse DMD of a source being tested in accordance with the present invention.
Figure 4:
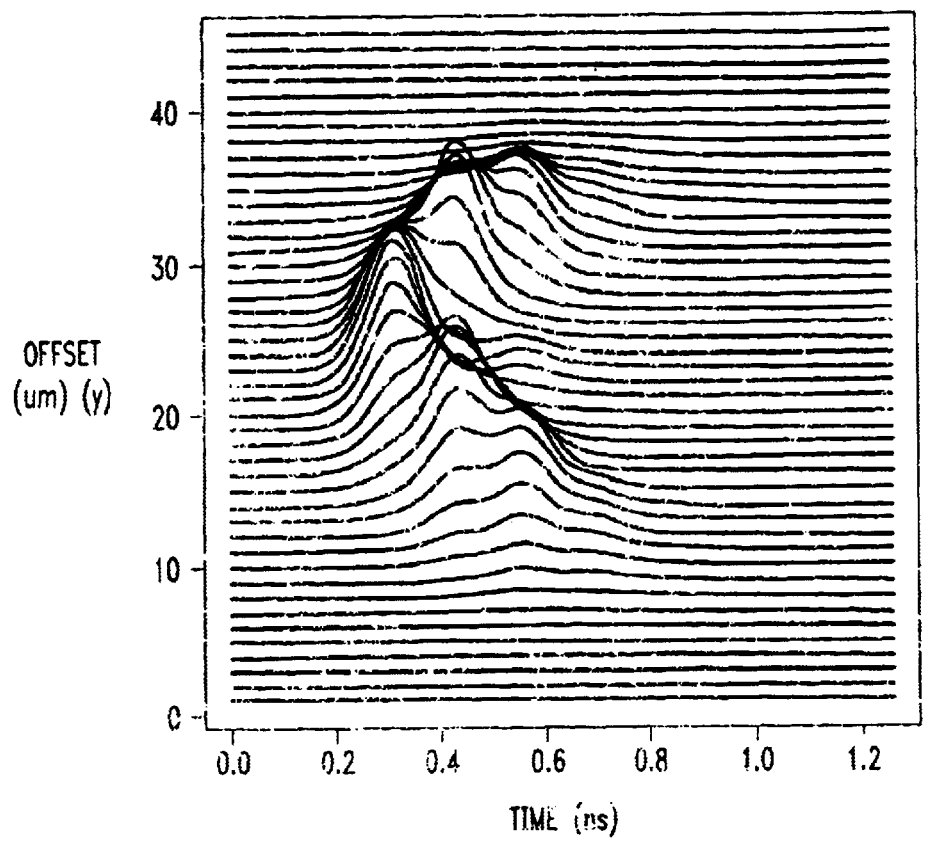
FIG. 4 is a graph illustrating simulated reverse DMD data resulting from a single mode source.

Once the DMD for the test fiber has been determined, a reverse DMD measurement is performed (using the same test fiber) to characterize a particular laser source. An exemplary test arrangement for this process is shown in FIG. 3, with a laser source 20 disposed to launch short pulses into input endface 14 of test fiber 10. A single mode fiber 22 is scanned across output endface 16 of test fiber 10 and used to measure the power at each position. Various launch conditions can be measured, as discussed above, including an axial launch or a launch offset from the optical axis of test fiber 10. Measurement unit 18 is used to store the power information as a function of time for this source. FIG. 4 illustrates the reverse DMD data recorded for a launch offset from the center of test fiber 10 by an amount y of approximately 8 $\mu$m.

The characterization of the test multimode fiber (DMD measurement) and characterization of the launch conditions (reverse DMD measurement) by means of scanning a SMF across the input and output endfaces, respectively, of the test multimode fiber, are described only as exemplary of an appropriate method for such characterization. Those skilled in the art will recognize that other appropriate techniques exist for the mode-selective launching and receiving of optical signals into and out of a multimode fiber, and will be able to modify the reconstruction algorithm as defined below so that it will apply to any other appropriate technique.

Once the DMD of the test fiber has been determined and the reverse DMD has been characterized for a specific launch condition, these measurements can be used to reconstruct the modal power distribution. The first step is to estimate the parameters $\tau_i$, $\sigma_i$, and $\gamma_i$ that are used in the propagation model as discussed above and defined in equation (1). In one embodiment, this is accomplished by fitting a nonlinear model to the measured DMD data. Presuming the defined impulse response $h_{DMD}(y,t)$ denotes the modal power at output endface 16 of fiber 10 at time t when single mode launch fiber 12 is offset by a distance y at input endface 14 of fiber 10 (see FIG. 1), a typical DMD measurement consists of measurements of $h_{DMD}$ at a matrix of points $\{(y_i, t_j)\}$ i=1 N, j=1, M. The data is modeled by the following:

$$h_{DMD}(y,t) \sim \Sigma p_n^{SMF}(y) h(t, \tau_n, \gamma_n, \sigma_n)$$

where n ranges over the degenerate mode groups of the fiber, $p_n^{SMF}(y)$ are the relative energies launched by single mode fiber 12 at offset y into the mode groups n of test fiber 10, and h is the impulse function as defined above. The value for $p_n^{SMF}(y)$ my be calculated by first computing the field amplitudes $a_{l,m}(y)$ launched into each mode (l,m) of the fiber (as discussed in *Optical Waveguide Theory*, A. W. Snyder et al, Chapman and Hall, London, 1983):

$$a_{l,m}(y) = \int d^2 x E_{SMF}^{(y)}(x) \cdot E_{MMF}^{(l,m)}(x)$$

And then computing the total power in mode group n:

$$p_n^{SMF}(y) = \sum_{l,m \in n} |a_{l,m}|^2$$

Since $p_n^{SMF}(y)$ are known, the parameters $\tau_i$, $\sigma_i$, and $\gamma_i$ can be fit to the data $h_{DMD}(y,t)$ via nonlinear least squares. As discussed above, once the test fiber has been characterized by forward DMD and these fiber parameters are estimated, the next step is to characterize the desired source (shown as element 20 in FIG. 3) by reverse DMD, with short pulses launched into test fiber 10 as a single mode fiber 22 is moved across output endface 16. The measured power coming out of single mode fiber 22 at offset y at time t is denoted as h'(y,t), which is given by:

$$h'(y,t) = \left| \sum_{l,m} c_{l,m}(t) \int d^2 x E_{MMF}^{l,m}(x) \cdot E_{SMF}^{(y)}(x) \right|^2$$

$$= \sum_n \sum_{l,m \in n} \left| c_{l,m}(t) \int d^2 x E_{MMF}^{l,m}(x) \cdot E_{SMF}^{(y)}(x) \right|^2$$

$$= \sum_n p_n(t) \sum_{l,m \in n} \left| \int d^2 x E_{MMF}^{l,m}(x) \cdot E_{SMF}^{(y)}(x) \right|^2$$

$$= \sum_n p_n(t) p_n^{SMF}(y)$$

$$= \sum_n p_n h_n(t) p_n^{SMF}(y)$$

The first line of the above equation expresses the measured intensity as the square of the amplitude of the field of single mode fiber 22, which is obtained as the inner product of the field of single mode fiber 22 and the field of test fiber 10. The field of multimode fiber 10, in turn, is a superposition of the individual modal fields, each with a time-dependent amplitude $c_{l,m}(t)$. In the second line, the assumption of mutual incoherence between the multimode fiber fields at endface 16 of fiber 10 is used to simplify the relation. The assumption of complete coupling within a mode group is used in the third line, which implies that all of the $C_{l,m}$ an equal within a mode group n, and allows $p_n(t)$ to be defined as follows:

$$p_n(t) = |c_{l,m}(t)|^2$$

for any l,m ∈n In the last two lines, equations (1) and (2) are substituted to arrive at the final solution, in which $p_n$ are the unknown energies of pulses launched into the various mode groups n. The variable $h_n(t)$ is defined as the pulse shape of mode n, which is given by the convolution of the pulse shape of source 20, denoted $h_{source}(t)$ and the impulse response of mode n:

$$h_n(t) = (h_{source} * h(; \tau_n, \gamma_n, \sigma_n))(t),$$

with the simplifying assumption made that source 20 launches the same pulse shape, but different energies, into the various modes of fiber 10.

Referring back to equation (3), the left-hand side is measured by reverse DMD, as discussed above. Every quantity is known in the right-hand side except for $p_n$, the modal power distribution value that is desired to be found. Therefore, in principle, $p_n$ can be computed by ordinary least squares. In practice, maintaining the exact alignment of the times from measurement to measurement is inconvenient Thus, it is easiest to include a single nonlinear parameter $t_{offset}$ to align the measured times in h'(y,t) and $h_n(t)$, which results in the following model:

$$h'(y,t) = \sum_n p_n h_n(t - t_{offset}) p_n^{SMF}(y)$$

Figure 5:
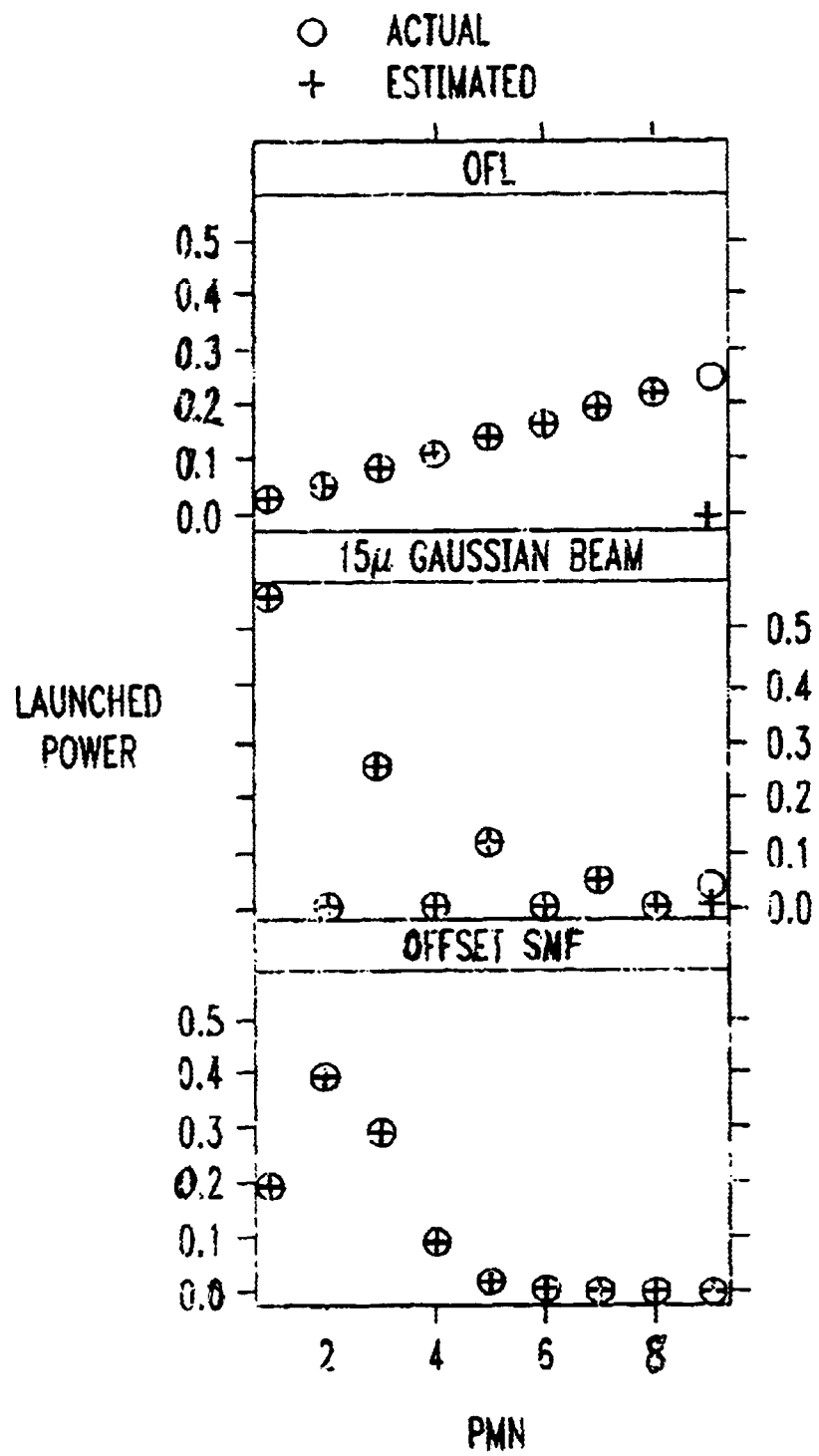
FIG. 5 is a graph containing the results of MPD reconstruction in the ideal case when all assumptions are satisfied.

The modal power distribution reconstruction algorithm discussed above has been applied to the reverse DMD data of FIG. 4, using the modal model parameters fit to the forward DMD data of FIG. 2. The results are illustrated in FIG. 5. The reconstructions are essentially exact, since there is no noise, and the above-described assumptions are exactly satisfied. The only modal power which was not found exactly was that of the highest mode group (PMN=10), which cannot be estimated using this method since the highest mode group is typically stripped by bend loss after a very short length of fiber.

In order to investigate the robustness of the modal power distribution measurement system of the present invention, the measurement was repeated while "violating" two of the assumptions in ways that might be encountered in practice. In the first, the DMD and reverse DMD data were simulated using a single mode fiber scan that misses the center of the multimode fiber by 2 μm, which is 10% of the core radius (which is considered to be a large deviation in practice). In the second, we simulated the DMD data using a single mode fiber beam radius of 3 μm while the reconstructions assume 2.5 μm. Again, in practice, such a large discrepancy (20%) would be uncommon.

Figure 6:
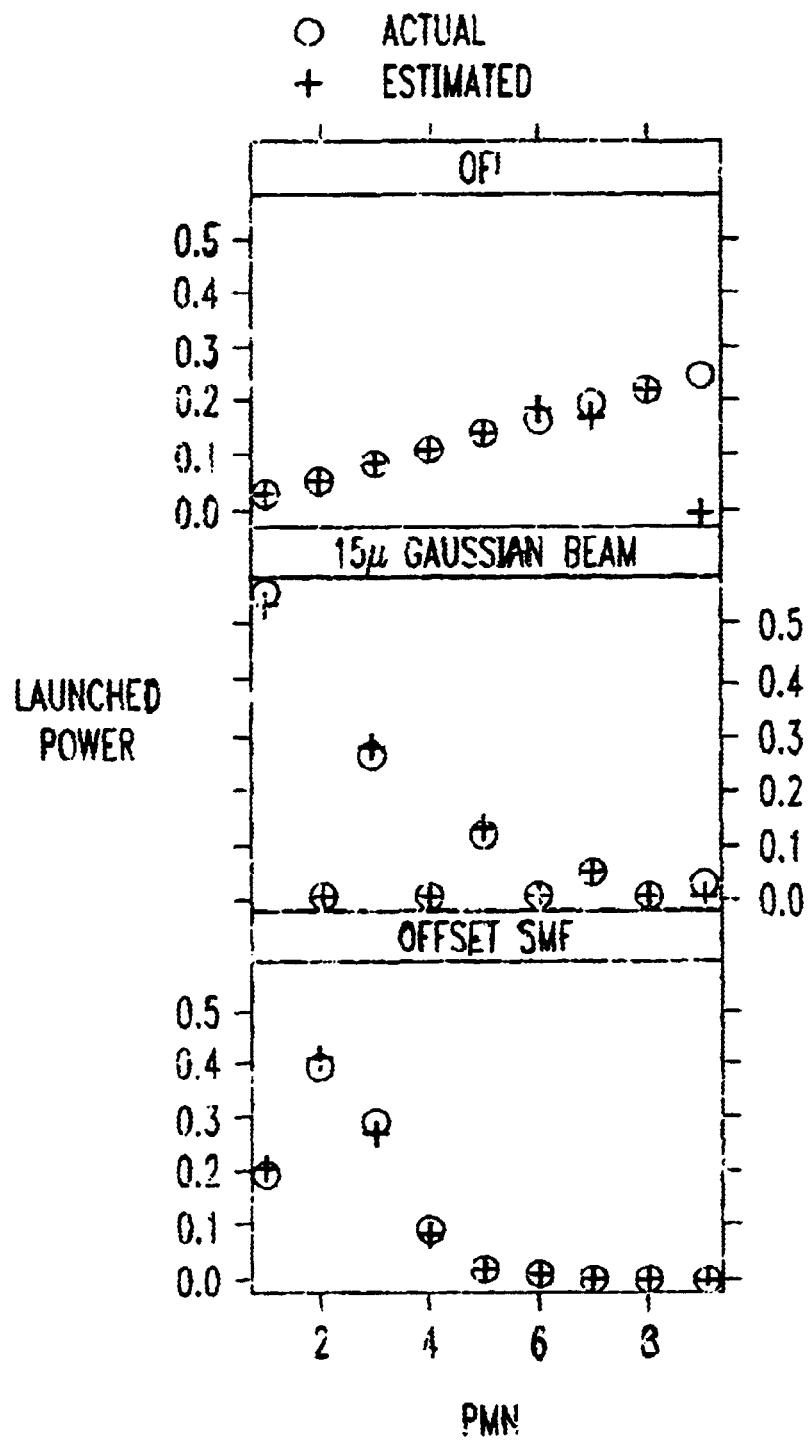
FIG. 6 is a graph illustrating MPD reconstructions for three different offsets in the launch conditions.
Figure 7:
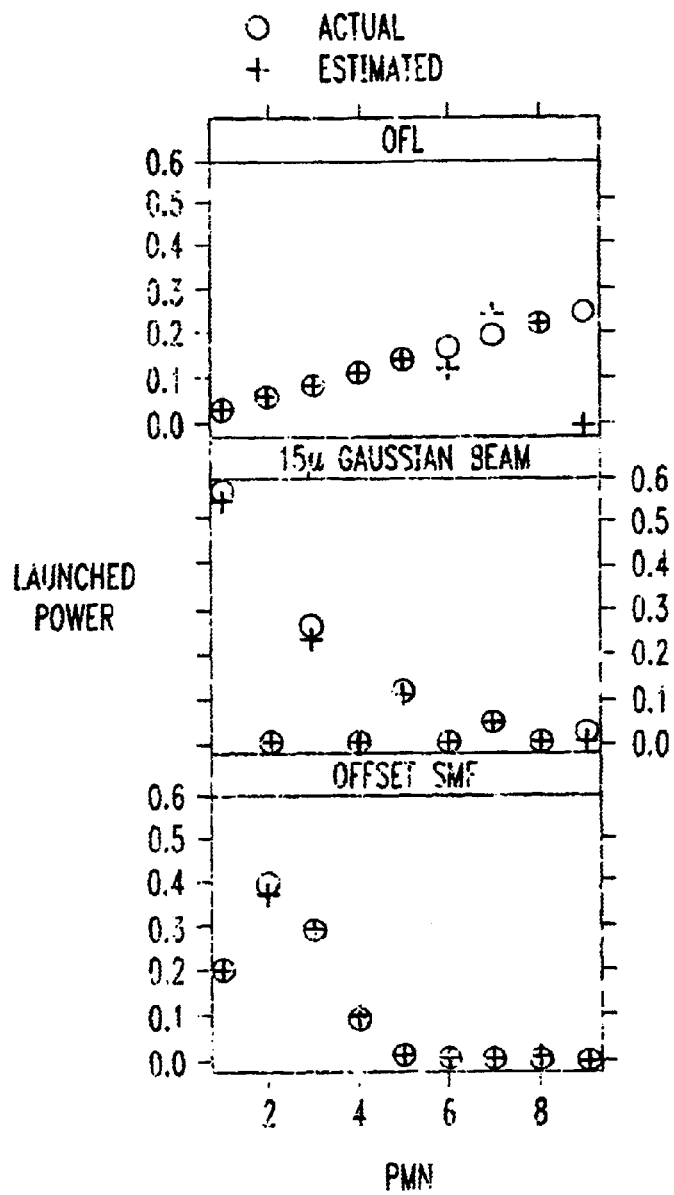
FIG. 7 is a graph illustrating the results of the MPD reconstruction of the present invention with a mismatch in the single mode fiber beam radius.

The results of the modal power distribution reconstructions of three launches with offset DMDs are shown in FIG. 6, and the results with the mismatch in single mode fiber beam radius are illustrated in FIG. 7. In both cases, it can be seen that the MPD is estimated quite accurately for the offset single mode fiber and axial Gaussian beam launches, while some error is evident in the highest order mode groups with the over-filled launch. In general, the robust performance of the MPD reconstruction of the present invention for low order modes is useful, given that it is these modes that are most likely to be excited by the restricted launches relevant for fast LAN applications. For the higher-order modes, the MPD reconstruction could be improved by introducing a penalty term to enforce smoothness of the approximations.

Figure 8:
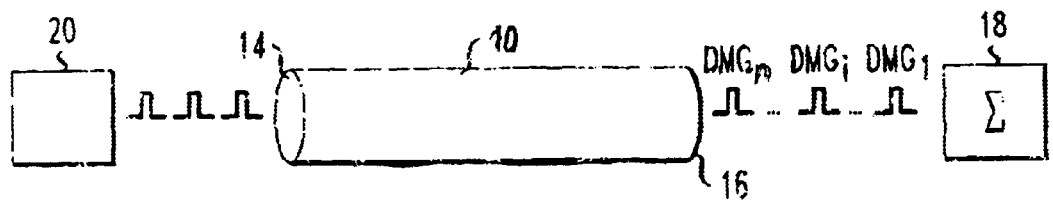
FIG. 8 illustrates an alternative measurement arrangement of the present invention, useful in situations where the multimode fiber is characterized by a relatively wide separation in group velocities between each mode group.

In an alternative embodiment of the present invention, under certain conditions it is possible to measure the modal power distribution of a source by replacing the reverse DMD measurement with a simpler impulse response measurement. When the source can produce short enough pulses of sufficient energy and small enough spectral width, a test fiber with sufficiently widely spaced mode group delays will result in the impulse responses of the individual mode groups being separated in time, as shown in FIG. 8. In this situation, the impulse response of the fiber under any launch will be a series of individual pulses, one per mode group.

The MPD of a source under test can be estimated by the following procedure. First, the DMD of the test fiber is measured, and the modal delays $\tau_i$, attenuations $\gamma_i$ and impulse response widths $\sigma_i$ of the individual mode groups, indexed by i, are estimated in the same manner as described above. Then, pulses from the source are launched into the test fiber, and the optical power p(t) present at the end of the test fiber is recorded as a function of time. Optionally, the impulse response h(t) of the fiber may be computed by standard methods, or the approximation h(t)=p(t) may be used. Finally, the optical power $p_i$ launched into mode group i may be estimated by the following:

$$p_i = e^{\gamma_i z} \int_{\tau_i - \varepsilon_i}^{\tau_i + \varepsilon_i} h(t)\,dt \Big/ \sum_{j=1}^{N} e^{\gamma_j z} \int_{\tau_j - \varepsilon_j}^{\tau_j + \varepsilon_j} h(t)\,dt$$

where z is the length of the test fiber and the $\epsilon_i$ are chosen so that the interval $(\tau_i-\epsilon_i, \tau_i+\epsilon_i)$ contains most of the energy of the impulse response of mode group i. A typical choice is $\epsilon_i=2\sigma_i$.

What is claimed is:

1. A method of determining the modal power distribution (MPD) of an optical source launching a lightwave signal into a multimode fiber, the multimode fiber comprising a plurality of N degenerate mode groups and defined as including an input endface, an output endface and a predetermined length z, the modal power distribution defined as the optical power launched into each mode group n of the plurality of N degenerate mode groups, the method comprising the steps of:

a) estimating responses $h_n(t)$ of each mode group to predetermined excitation pulses $h_{source}(t)$;
   b) transmitting excitation pulses $h_{source}(t)$ from an optical source through said multimode fiber, and measuring at the output endface of said multimode fiber a plurality of M mode-selective impulses responses h'(i,t) defined as follows:

$$h'(i,t) = \sum_n p_n(t) p_n^{selective}(i),$$

where $i \in \{1, \ldots, M\}$, $n \in \{1, \ldots, N\}$, $p_n(t)$ is defined as the impulse response of mode group n, and $p_n^{selective}(i)$ is defined as the fraction of power in mode group n under excitation by the source that is received in the $i^{th}$ mode-selective measurement; and
   c) determining the optical power $p_n$ launched into each mode group n of the plurality of N degenerate mode groups by setting $p_n(t) = p_n h_n(t)$ and solving the following equation for $p_n$:

$$h'(i,t) = \sum_n p_n h_n(t) p_n^{selective}(i).$$

2. The method as defined in claim 1 wherein in performing step a), a differential mode delay measurement, using a single mode fiber, is used to transmit pulses into the input endface of the multimode fiber.

3. The method as defined in claim 1 wherein in performing step b), the mode-selective impulse responses are measured with a single mode fiber located at a plurality of distinct positions at the endface of the multimode fiber.

4. The method as defined in claim 1 wherein in performing step b), the following steps are performed:

i) computing the optical field amplitude $a_{l,m}(y)$ coupled into each mode group n; and
   ii) computing the relative energy $p_n^{selective}(y)$ for each mode group n using the following relation:

$$p_n^{selective}(y) = \sum_{l,m \in n} |a_{l,m}|^2.$$

5. A method of determining the modal power distribution (MPD) of an optical source launching a lightwave signal into a multimode fiber, the multimode fiber comprising a plurality of N degenerate mode groups and defined as including an input endface, an output endface and a predetermined length z, the modal power distribution defined as the optical power launched into each mode group n of the plurality of N degenerate mode groups, the method comprising the steps of:

a) estimating, by means of an appropriate measurement, the mode group delays $\tau_i$, attenuations $\gamma_i$ and impulse response widths $\tau_i$ of each of the mode groups of the multimode fiber;
   b) transmitting pulses $h_{source}(t)$ from the optical source through said multimode fiber, and measurement the impulse response h(t) of the multimode fiber; and
   b) calculating the optical power $p_i$ launched into each mode group i of the plurality of N degenerate mode groups using:

$$p_i = e^{\gamma_i z} \int_{\tau_i - \varepsilon_i}^{\tau_i + \varepsilon_i} h(t)\,dt \Big/ \sum_{j=1}^{N} e^{\gamma_j z} \int_{\tau_j - \varepsilon_j}^{\tau_j + \varepsilon_j} h(t)\,dt$$

where the $\epsilon_i$ are chosen so that the interval $(\tau_i-\epsilon_i, \tau_i+\epsilon_i)$ contains most of the energy of the impulse response of mode group i.

6. The method as defined in claim 5 wherein in performing step a), a differential modal delay measurement, incorporating a single mode fiber transmitting pulses into the input endface of the multimode fiber, is used.

* * * * *